US009063544B2

(12) United States Patent
Vian et al.

(10) Patent No.: US 9,063,544 B2
(45) Date of Patent: Jun. 23, 2015

(54) AERIAL FOREST INVENTORY SYSTEM

(71) Applicant: The Boeing Company, Chicago, IL (US)

(72) Inventors: John Lyle Vian, Renton, WA (US); Joshua Przybylko, Boston, MA (US)

(73) Assignee: THE BOEING COMPANY, Chicago, IL (US)

( * ) Notice: Subject to any disclaimer, the term of this patent is extended or adjusted under 35 U.S.C. 154(b) by 100 days.

(21) Appl. No.: 13/712,165

(22) Filed: Dec. 12, 2012

(65) Prior Publication Data

US 2014/0163772 A1 Jun. 12, 2014

(51) Int. Cl.

| G05D 1/00 | (2006.01) |
|---|---|
| G06K 9/46 | (2006.01) |
| G06Q 50/00 | (2012.01) |
| G06Q 30/00 | (2012.01) |
| H04N 7/18 | (2006.01) |

(52) U.S. Cl.
CPC ............... *G05D 1/0094* (2013.01); *G06K 9/46* (2013.01); *H04N 7/18* (2013.01)

(58) Field of Classification Search
CPC ........... G05D 1/00; G06K 9/46; G06Q 50/00; H04N 7/18
USPC ............................................................ 701/2
See application file for complete search history.

(56) References Cited

U.S. PATENT DOCUMENTS

| 5,999,882 | A * | 12/1999 | Simpson et al. ................... 702/3 |
|---|---|---|---|
| 6,792,684 | B1 | 9/2004 | Hyyppa |
| 7,187,452 | B2 | 3/2007 | Jupp et al. |
| 7,212,670 | B1 | 5/2007 | Rousselle |
| 7,974,813 | B2 | 7/2011 | Welty et al. |
| 8,125,719 | B2 | 2/2012 | Aoi |
| 8,208,689 | B2 | 6/2012 | Savolainen et al. |
| 2009/0094079 | A1* | 4/2009 | Linville ............................. 705/7 |
| 2010/0250482 | A1 | 9/2010 | Ma |
| 2011/0055220 | A1* | 3/2011 | Tyburski ....................... 707/743 |
| 2012/0261144 | A1* | 10/2012 | Vian et al. ....................... 169/43 |

OTHER PUBLICATIONS

Suzuki et al., "A GIS-based study toward forecast of suburban forest change", GeoJournal, vol. 52, No. 3, Mar. 2001, pp. 203-212.
Hosford et al., "Fusion of airborne laser altimeter and RADARSAT data for DEM generation", Proceedings of 2003 IEEE International Geoscience and Remote Sensing Symposium, vol. 2, Jul. 2003, 3 Pages.
Ackermann, "Digital Terrain Models—New Techniques, Demands, Concepts", IAPRS, vol. 32, Part 3-4w2, "3D Reconstruction and Modeling of Topographic Objects", Sep. 1997, 8 Pages.
Wallace et al., "Development of a UAV-LiDAR System with Application to Forest Inventory", Remote Sensing, May 2012, pp. 1519-1543.
"Unmanned Aerial Vehicle (UAV) Zala 421-04M chosen for Aerial Monitoring of Forest Fires", news.wood.ru, Feb. 2010, 3 Pages.

* cited by examiner

*Primary Examiner* — Fadey Jabr
*Assistant Examiner* — Yazan A Soofi
(74) *Attorney, Agent, or Firm* — Yee & Associates, P.C.

(57) ABSTRACT

A method and apparatus for generating information about a forest. A number of locations in the forest are identified over which an electromagnetic energy sensor system in an unmanned aerial vehicle generates the information about the forest by generating a point cloud with a resolution that meets a point cloud threshold. A route is generated for the unmanned aerial vehicle to move to the number of locations and generate the information about the forest in the number of locations.

19 Claims, 11 Drawing Sheets

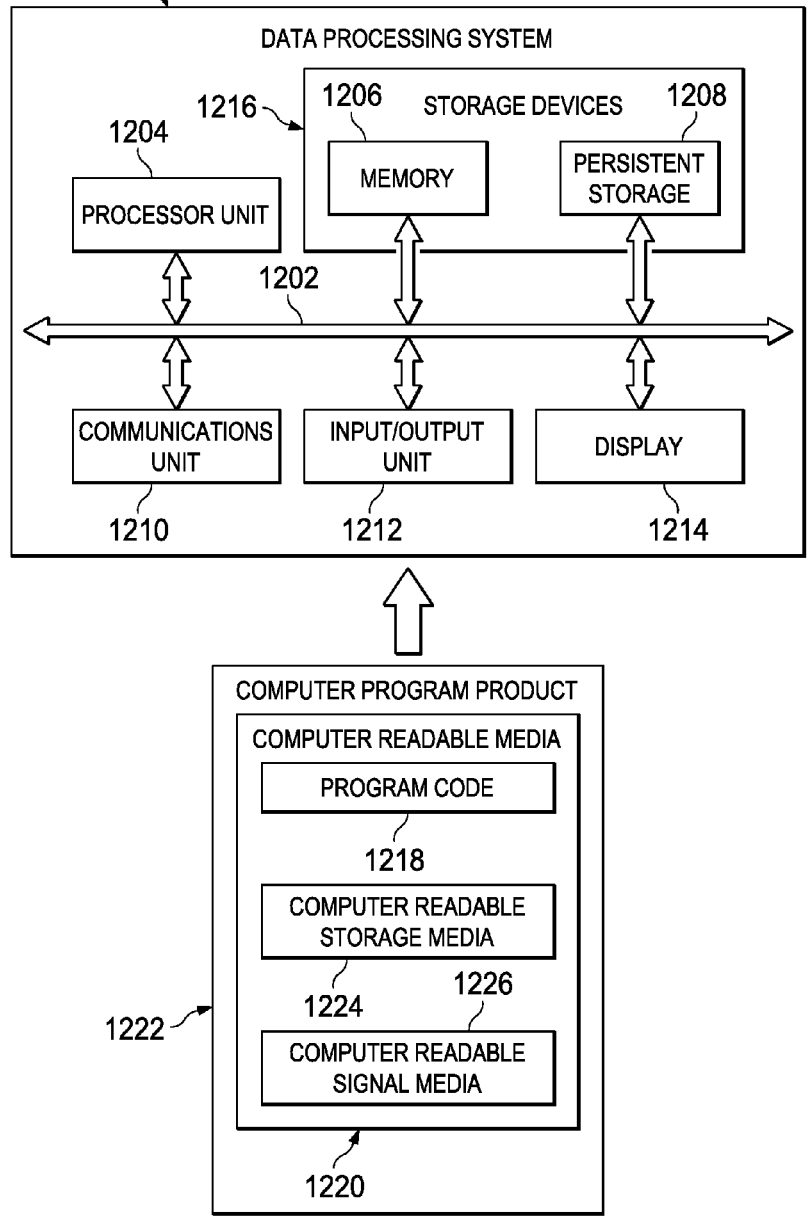

AERIAL FOREST INVENTORY SYSTEM

CROSS-REFERENCE TO RELATED APPLICATION

This application is related to the following patent application: entitled "Forestry Management System", Ser. No. 13/622,739, filed Sep. 19, 2012; which is incorporated herein by reference.

BACKGROUND INFORMATION

1. Field

The present disclosure relates generally to aerial surveys and, in particular, to aerial surveys of forests. Still more particularly, the present disclosure relates to a method and apparatus for performing a forest inventory through an aerial survey.

2. Background

Forestry management is a branch of forestry that includes many different aspects. These aspects may include environmental, economic, administrative, legal, and social aspects of managing a forest. Forestry management may consist of various techniques such as timber extraction, planting trees, replanting trees, cutting roads and pathways through forests, preventing fires in a forest, maintaining the health of the forest, and other suitable activities.

When performing these and other operations with respect to forest management, collecting information about the forest may be desired. For example, collecting information about the forest provides an ability to analyze the state of the forest as well as identify missions that may be performed. These missions may include, for example, at least one of replanting trees, harvesting trees, thinning the forest to improve growth, applying fertilizer, performing pest removal, generating warnings of potential fire conditions, initiating fire risk reduction activities, removing dead wood, reducing forest floor undergrowth, performing timber improvement activities, and other suitable operations.

In obtaining information about a forest, aerial surveys may be performed as part of a forest inventory mission to identify information about a forest. A forest inventory mission may be a mission configured to identify information about a forest for assessment or analysis. This information may be used to identify types of trees, height of trees, age of trees, health of trees, forest boundaries, and other suitable information about trees in the forest. For example, a number of trees per acre may be identified through a forest inventory mission.

Additionally, a forest inventory mission also may be used to identify other information about vegetation, wildlife, or both vegetation and wildlife within a forest. A forest inventory mission may also show a presence of dead or decaying trees. In this case, information about dead or decaying trees may indicate a pest problem. Moreover, a forest inventory mission may be configured to identify boundaries of the forest.

Aerial surveys may be performed using at least one of manned aerial vehicles or unmanned aerial vehicles. As an example, an unmanned aerial vehicle may fly over a forest to generate information about the forest for a forest inventory mission. The unmanned aerial vehicle may include a light detection and ranging (LiDAR) system and a camera system. The light detection and ranging system may be used to send light in the form of a laser beam toward the forest.

Currently, an aerial vehicle is flown a route by a pilot that takes the aerial vehicle over different locations in a forest. These locations are selected such that the aerial vehicle can generate information about all or a portion of the forest. The aerial vehicle scans a location with a laser beam using a light detection and ranging system. The light detection and ranging system measures the distance to points in the forest by measuring the time light takes to return to the light detection and ranging system. From these measurements, the light detection and ranging system may generate information about locations in the forest.

The responses to the laser beam detected by the light detection and ranging system are used to generate a point cloud for the forest. This point cloud may be used to generate information such as canopy height, crown volume estimates, density of trees, and other important information.

In performing these types of aerial surveys, cost is one factor that may affect when and how often aerial surveys are performed. The cost of sending one or more aerial vehicles to generate a point cloud for different locations in a forest often is significant. To make the performance of an aerial survey more economical, large areas are surveyed each time an aerial survey is performed. For example, when an aerial survey is performed, about 50,000 or more acres are surveyed to reduce the cost per acre for performing an aerial survey.

Further, the aerial surveys are typically performed at some safe height above terrain, and around obstacles and clouds that may be present. When obstacles are present, the unmanned aerial vehicle may need to fly higher over the forest. As the height of the unmanned aerial vehicle over the area being surveyed increases, the density of the point cloud generated by the aerial survey may decrease. As a result, when an aerial survey is performed, the level of resolution of the point cloud from information that can be gathered for a forest may not be as high as desired.

Further, at these higher heights, cloud cover may obstruct the laser used to perform an aerial inventory. For example, a cloud may cause the laser to be reflected, refracted, or be otherwise directed away from the forest to be surveyed. When the laser is reflected or refracted, the responses detected by the light detection and ranging system may be inaccurate because the responses may be those from the clouds rather than the forest. As a result, the information in a point cloud for a forest may have gaps where a location is covered by a cloud when an aerial survey is performed.

Additionally, due to the cost of conducting a forest inventory mission, it is often only economical to survey the forest at irregular intervals in time. Thus, long periods of time lapse between surveys of a forest. For example, a forest may only be surveyed after long periods of time such as four years due to personnel limitations, equipment limitations, and cost of an aerial survey. A location that is missed during one survey because of cloud cover may not be resurveyed for another four years. As a result, an eight year gap may be present between the collection of information for a particular location in a forest.

Currently, one manner in which the gaps in information generated by the aerial survey may be reduced is by careful scheduling of the aerial survey. For example, an aerial survey is typically only performed when the cloud cover over the forest is nonexistent or below a certain percentage. As a result, selecting times when cloud cover is nonexistent or sufficiently low to obtain a desired amount of information may reduce issues in gaps in information generated because of the presence of cloud cover. If weather conditions result in the cloud cover changing to have clouds that cover more of the forest than desired, the aerial survey may be rescheduled to another time when the clouds in the cloud cover obscuring the forest is at a thin enough level to generate the information with a desired level of quality.

Although rescheduling an aerial survey to a time when the cloud cover is sufficiently low may allow for gathering a desired amount of information about the forest, the rescheduling of the aerial survey may be more costly than desired. Oftentimes, rescheduling an aerial survey may increase the cost of performing the aerial survey.

Furthermore, operators of aircraft that perform surveys using light detection and ranging systems may have different amounts of demand based on the season of the year. For example, a higher demand may be present in summer months when cloud cover is less common as compared to winter months. These peaks and troughs in demand for aerial surveys using aircraft with light detection and ranging systems may increase average prices for such services in regions where cloud cover is more frequent.

Additionally, the cost for performing aerial surveys using aircraft with light detection and ranging systems may vary over different geographic regions. For example, the cost to perform an aerial survey of a forest in Seattle may be more expensive than to perform a similar survey of a forest in Texas. The amount of cloud cover in Seattle may lead to greater seasonal spikes and troughs in demand for performing aerial surveys using aircraft with light detection and ranging systems.

Another solution involves the unmanned aerial vehicle flying below the clouds in the cloud cover. Flying at these lower levels may result in the unmanned aerial vehicle encountering more weather conditions that may be hazardous to the vehicles and reduce the field of view of the sensor. Further, the unmanned aerial vehicle may encounter increased obstructions such as power lines, rock outcroppings, cell towers, and other types of obstructions when flying at lower levels below the cloud cover.

Moreover, in populated areas, a low-flying unmanned aerial vehicle may raise privacy concerns with individuals in the area being surveyed. Flying the unmanned aerial vehicle at lower levels may also result in a reduced surface area of the scan as compared to flying the unmanned aerial vehicle at a higher altitude. For example, for each 10 percent reduction in altitude, the amount of time needed to complete an aerial survey increases by about 10 percent.

Although the resolution of the point cloud may increase with the lower altitude, the efficiency with respect to time decreases. In other words, flying at lower altitudes may result in more time needed to generate the point cloud. This additional time may increase the cost of the aerial survey, which is an increase in expense that is unwarranted if the additional resolution in the point cloud is not desired.

In some cases, multiple unmanned aerial vehicles may be used to perform the aerial survey when performing aerial surveys at lower altitudes. The additional unmanned aerial vehicles may be used to cover all of the forest and keep the performance of the aerial survey within a limited timeframe. Longer timeframes may result in cloud cover occurring which may reduce the coverage of the aerial survey.

Additionally, flying at lower altitudes may result in increased risk for icing conditions and turbulence. With these conditions, the times at which aerial surveys may be performed may become more limited. For example, even though clouds may be absent, these conditions at lower altitudes may also prevent the performance of an aerial survey. Thus, aerial surveys performed at lower altitudes may end up being more costly than desired as compared to aerial surveys performed at higher altitudes above the clouds.

Therefore, it would be desirable to have a method and apparatus that takes into account at least some of the issues discussed above, as well as other possible issues.

SUMMARY

In one illustrative embodiment, an apparatus comprises an unmanned aerial vehicle, an electromagnetic energy sensor system, and a survey controller. The electromagnetic energy sensor system is associated with the unmanned aerial vehicle. The electromagnetic energy sensor system is configured to generate information about a forest. The survey controller is configured to identify a number of locations over the forest in which an effect of cloud cover on an information level of the information generated about the forest by the electromagnetic energy sensor system is reduced.

In another illustrative embodiment, an aerial survey system comprises an unmanned aerial vehicle fleet and a survey controller. The survey controller is configured to control generation of information about a number of locations in an area of land based on cloud cover over a number of locations.

In yet another illustrative embodiment, a method for generating information about a forest is presented. A number of locations in the forest are identified over which an electromagnetic energy sensor system in an unmanned aerial vehicle generates the information about the forest by generating a point cloud with a resolution that meets a point cloud threshold. A route is generated for the unmanned aerial vehicle to move to the number of locations and generate the information about the forest in the number of locations.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 12 is an illustration of a block diagram of a data processing system in accordance with an illustrative embodiment.

DETAILED DESCRIPTION

The illustrative embodiments recognize and take into account one or more different considerations. For example, the illustrative embodiments recognize and take into account that avoiding cloud cover is desirable to obtain a desired level of quality of information when performing an aerial survey using a light detection and ranging system. Further, the illustrative embodiments recognize and take into account that with currently used methods of performing aerial surveys, cloud cover may result in gaps in information about the forest because of long periods of time between surveys. Additionally, flying below the cloud cover is an inefficient use of the sensor, requiring significantly more flight time and increasing the cost of performing the aerial survey.

The illustrative embodiments also recognize and take into account that although cloud cover may be present over a forest during a particular point in time, the cloud cover may not cover all of the forest at that time. As a result, one or more locations may be present in which clouds are absent over the forest. In other words, gaps in the clouds over these locations may allow for desired collection information about the forest using a light detection and ranging system on an unmanned aerial vehicle. The illustrative embodiments recognize and take into account that the aerial survey may be performed over locations in which clouds are absent from the cloud cover.

Further, the illustrative embodiments recognize and take into account that the locations in which cloud cover is absent often shift with the movement of the clouds. The illustrative embodiments also recognize and take into account that an aerial survey may be performed in a manner that takes into account the shifting of locations in which the cloud cover is absent or thin enough to provide a desired amount of information.

Thus, the illustrative embodiments provide a method and apparatus for performing an aerial survey of a forest. In one illustrative embodiment, an apparatus comprises an unmanned aerial vehicle, an electromagnetic energy sensor system associated with the unmanned aerial vehicle, and a survey controller.

The electromagnetic energy sensor system is configured to generate information about the forest. The survey controller is configured to identify a number of locations over the forest in which a desirable condition is present for the electromagnetic energy sensor system to generate the information about the forest with a desired level of quality. As used herein, a "number of" when used with reference to items means one or more items. For example, a number of locations is one or more locations.

Figure 1:
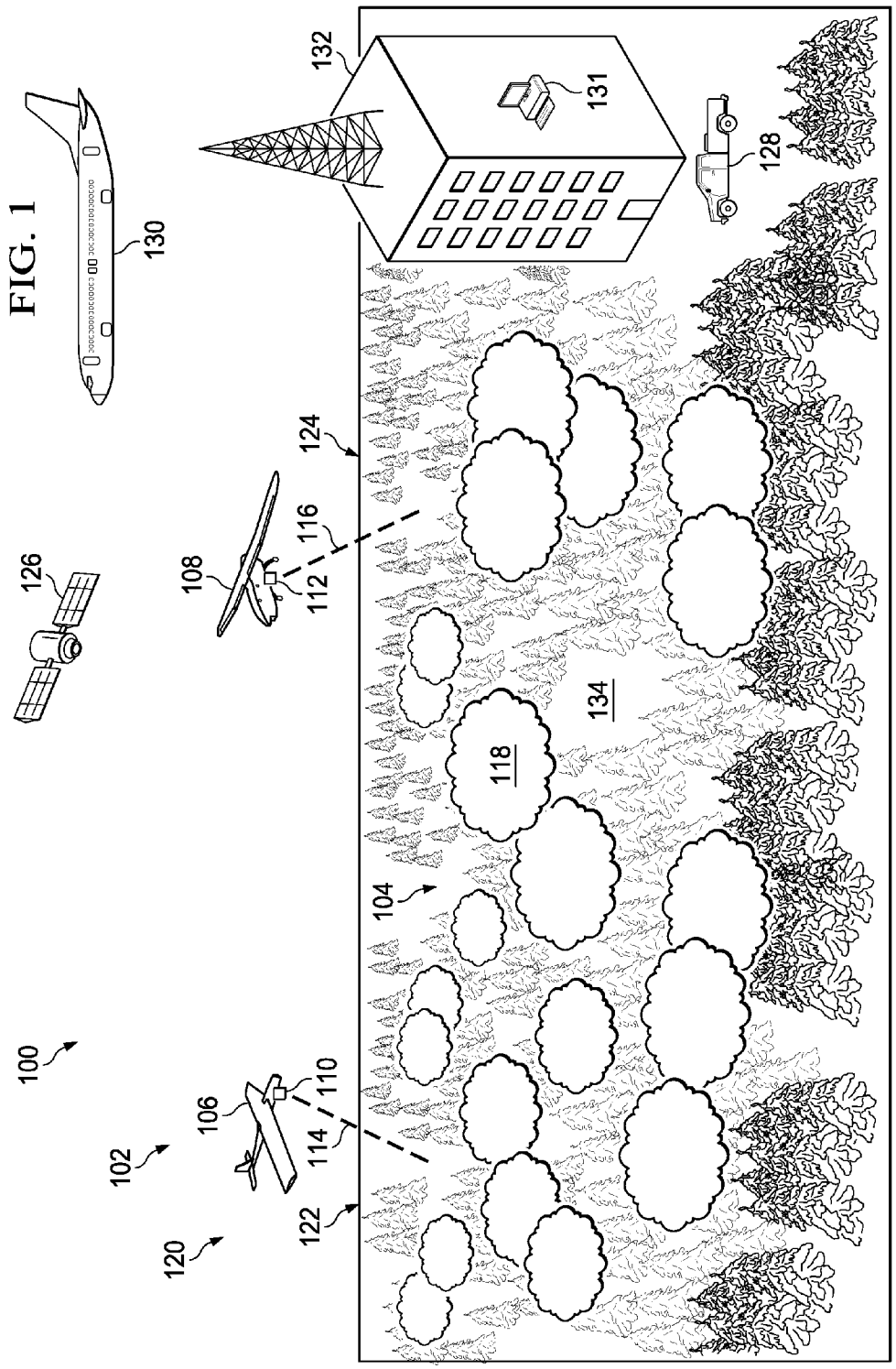
FIG. 1 is an illustration of an aerial survey environment in accordance with an illustrative embodiment.

With reference now to FIG. 1, an illustration of an aerial survey environment is depicted in accordance with an illustrative embodiment. In this depicted example, aerial survey environment 100 includes unmanned aerial vehicles 102 which fly over forest 104. As depicted, unmanned aerial vehicles 102 include unmanned aerial vehicle 106 and unmanned aerial vehicle 108.

In this particular example, unmanned aerial vehicles 102 are configured to perform an aerial survey of forest 104. Unmanned aerial vehicle 106 has light detection and ranging system 110 and unmanned aerial vehicle 108 has light detection and ranging system 112.

As depicted, light detection and ranging system 110 is configured to scan forest 104 with laser beam 114. Responses to the scanning of laser beam 114 are detected by light detection and ranging system 110. This scanning may be achieved by sweeping or moving laser beam 114 over forest 104. This scanning may have a pattern that is similar to a raster scan performed in generating displays on a display device in some illustrative examples. Of course, this scanning may occur with the laser beam sweeping with any pattern that is configured to generate information about forest 104 when responses to laser beam 114 are detected.

These responses may be used to form a point cloud for the portions of forest 104 scanned with laser beam 114. The point cloud provides vertices or data points about forest 104. These vertices may be used to identify features in forest 104 such as trees, leaves, branches, and other suitable features.

In a similar fashion, light detection and ranging system 112 in unmanned aerial vehicle 108 also is configured to generate information about forest 104 using laser beam 116. Laser beam 116 also may sweep across forest 104 as unmanned aerial vehicle 108 flies over forest 104. The responses to laser beam 116 also may be detected and used to generate a point cloud. The point clouds for the different portions of forest 104 scanned with laser beam 114 and laser beam 116 may be combined to form a point cloud for forest 104.

In this illustrative example, clouds 118 are present over forest 104. As depicted, unmanned aerial vehicles 102 fly over clouds 118. As a result, clouds 118 generate cloud cover that may prevent unmanned aerial vehicles 102 from generating information about all of forest 104.

Locations 120 in which clouds 118 are absent may be identified. In some illustrative examples, locations 120 may be locations in which clouds 118 may be present but thin enough or have a composition that still allows for a desired amount of information to be generated by unmanned aerial vehicles 102.

In this illustrative example, locations 120 include location 122 and location 124. With the identification of locations 120, unmanned aerial vehicles 102 may be controlled to fly over locations 120 to generate information about forest 104. For example, unmanned aerial vehicle 106 may be controlled to fly over location 122 while unmanned aerial vehicle 108 is controlled to fly over location 124 in performing the aerial survey of forest 104.

Further, as locations 120 shift with the movement of clouds 118, the routes of unmanned aerial vehicles 102 also may be changed to redirect unmanned aerial vehicles 102 to the new locations in which clouds 118 allow for a desired level of quality for information to be generated about forest 104.

As a result, unmanned aerial vehicles 102 may be routed dynamically during the performance of the aerial survey of forest 104. In these illustrative examples, routes for unmanned aerial vehicles 102 may be changed as locations 120 in which clouds 118 are absent allow for generating a desired level quality for information about forest 104.

In particular, the change in the routes for unmanned aerial vehicles 102 may be generated such that all of forest 104 is scanned to generate information for a point cloud of forest 104. Alternatively, if all of forest 104 cannot be scanned in view of clouds 118, the illustrative embodiments allow for an increase in how much of forest 104 may be scanned as compared to currently used techniques. In other words, with the use of an illustrative embodiment, more of forest 104 may be scanned using a dynamic route for unmanned aerial vehicles 102 than with currently used aerial survey systems, given cloudy conditions.

In these illustrative examples, information about clouds 118 may be generated from a number of different sources. For example, information about clouds 118 may take the form of images generated by sources such as satellite 126, ground-based all sky imager 128, aircraft 130, unmanned aerial vehicle 106, unmanned aerial vehicle 108, and other suitable sources.

Satellite 126 may generate images of clouds 118 over forest 104. Ground-based all sky imager 128 may generate an image of clouds 118 from ground 134. In a similar fashion, aircraft 130 may fly above clouds 118 and generate images of clouds 118 over forest 104. This information generated by at least one of satellite 126, ground-based all sky imager 128, and aircraft 130 may be sent to at least one of unmanned aerial vehicles 102 and survey controller 131 in control station 132.

In these illustrative examples, one or both of unmanned aerial vehicles 102 and survey controller 131 in control station 132 may use the information generated by at least one of satellite 126, ground-based all sky imager 128, and aircraft 130 to identify where clouds 118 are located. In this manner, locations 120 in which clouds 118 are absent may be identified. In these illustrative examples, routes may be generated for unmanned aerial vehicles 102 to fly over locations 120. In these illustrative examples, this routing may be performed by at least one of unmanned aerial vehicles 102 and survey controller 131.

In these examples, the identification of locations 120, the routing of unmanned aerial vehicles 102, or both may be performed at another location other than unmanned aerial vehicles 102. For example, these operations may be performed by survey controller 131 in control station 132 which may then send routing information to unmanned aerial vehicles 102.

This routing of unmanned aerial vehicles 102 over forest 104 may be performed such that more information about forest 104 is generated as compared to performing the aerial survey with a fixed route when clouds 118 are present.

Figure 2:
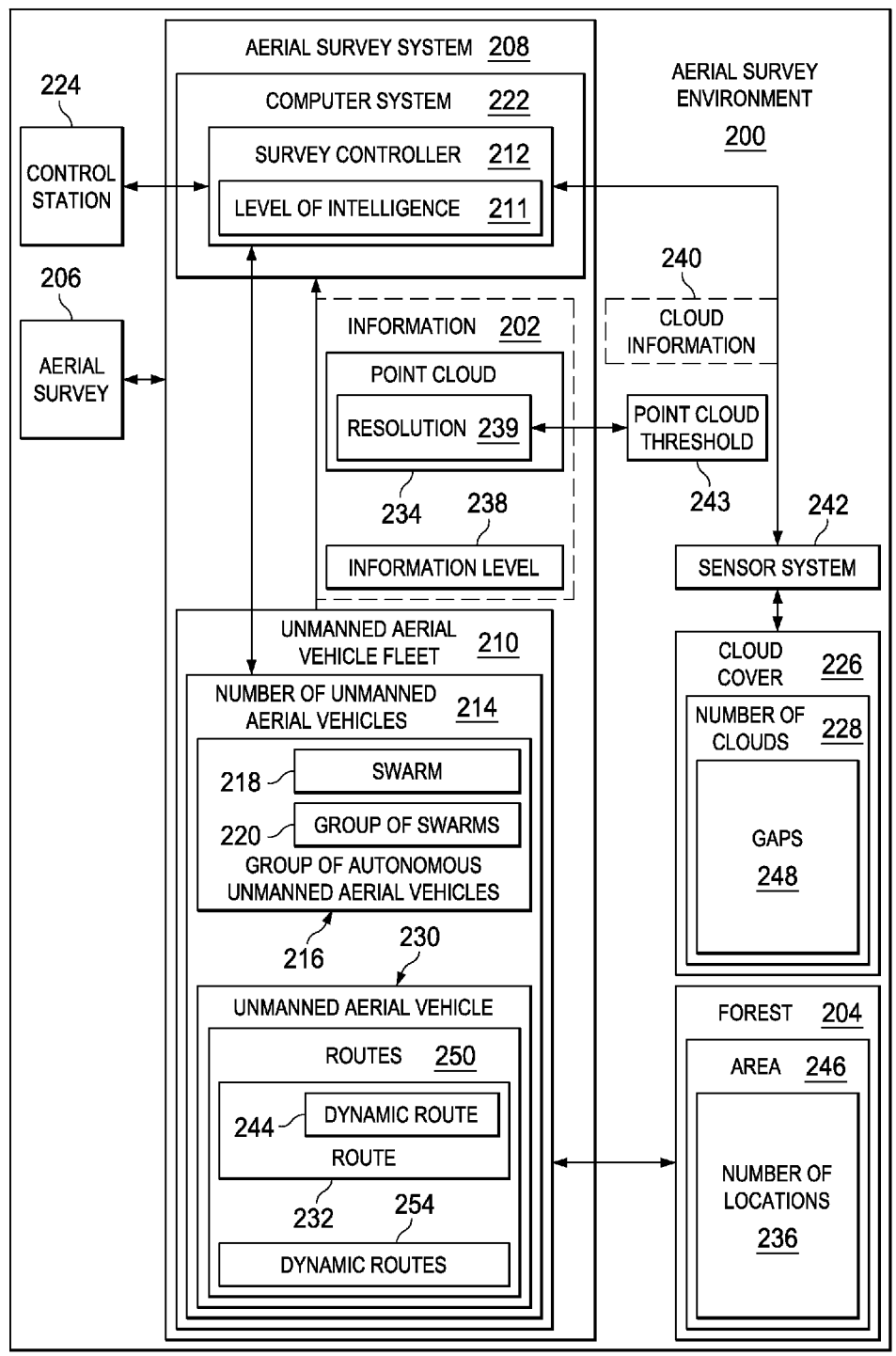
FIG. 2 is an illustration of a block diagram of an aerial survey environment in accordance with an illustrative embodiment.

Turning now to FIG. 2, an illustration of a block diagram of an aerial survey environment is depicted in accordance with an illustrative embodiment. Aerial survey environment 100 in FIG. 1 is an example of one implementation for aerial survey environment 200 in FIG. 2.

In this illustrative example, aerial survey environment 200 is an example of an environment in which information 202 may be generated for forest 204. In particular, aerial survey 206 may be performed for area 246 in forest 204. Area 246 may be some or all of forest 204 depending on the particular implementation.

In these illustrative examples, information 202 may include point cloud 234. Point cloud 234 comprises vertices in a three-dimensional coordinate system. These vertices are typically described using x, y, and z coordinates. These vertices are intended to be representative of the external surface of an object such as a tree. These vertices may also be referred to as points.

As depicted, information 202 may be generated through aerial survey 206 performed using aerial survey system 208. In this example, aerial survey system 208 includes unmanned aerial vehicle fleet 210 and survey controller 212.

In these illustrative examples, survey controller 212 may be implemented using hardware, software, or a combination of the two. In these illustrative examples, the hardware may take the form of a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations.

Examples of programmable logic devices include, for example, a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being. For example, the processes may be implemented as circuits in organic semiconductors.

As depicted, survey controller 212 may be implemented in computer system 222. Computer system 222 includes one or more computers. When more than one computer is present in computer system 222, those computers may communicate with each other over a communications medium such as a network.

In these illustrative examples, survey controller 212 in computer system 222 may be in a single location such as control station 224. Control station 224 may be located in a building on the ground, an aircraft, a ship, a space station, a satellite, a ground vehicle, or in some other suitable location.

In other examples, survey controller 212 may be distributed in different locations. For example, survey controller 212 may be distributed among one or more of number of unmanned aerial vehicles 214 in unmanned aerial vehicle fleet 210. In still other illustrative examples, survey controller 212 may be located in number of unmanned aerial vehicles 214 and control station 224 depending on the particular implementation. Additionally, survey controller 212 may be located in a remote location in other illustrative examples.

In these illustrative examples, survey controller 212 may have level of intelligence 211. Level of intelligence 211 may vary depending on the implementation of survey controller 212. In some cases, survey controller 212 may be a computer program that receives input from a human operator and provides output to a human operator.

In still other illustrative examples, level of intelligence 211 may be higher such that input from a human operator may be unnecessary. For example, an artificial intelligence system and other suitable types of processors may provide a desired level of intelligence for level of intelligence 211 in survey controller 212. In particular, the artificial intelligence system may include an expert system, a neural network, simple heuristics, linear, nonlinear, or integer program, fuzzy logic, Bayesian networks, or some other suitable type of system that provides a desired level of intelligence for level of intelligence 211 in survey controller 212.

In this illustrative example, unmanned aerial vehicle fleet 210 includes number of unmanned aerial vehicles 214. As depicted, number of unmanned aerial vehicles 214 may be or may include group of autonomous unmanned aerial vehicles 216. Group of autonomous unmanned aerial vehicles 216 may be configured to operate as swarm 218 or group of swarms 220 in these illustrative examples.

One or more of number of unmanned aerial vehicles 214 are configured to perform aerial survey 206 to generate information 202 about forest 204. In these illustrative examples, number of unmanned aerial vehicles 214 may fly routes 250 over forest 204 to generate information 202. Routes 250 may be generated by survey controller 212 in these illustrative examples.

As depicted, routes 250 are generated and sent to number of unmanned aerial vehicles 214 from survey controller 212. In this case, aerial survey system 208 is configured using centralized control methods. In alternative embodiments, survey controller 212 may be implemented in software and hardware that are distributed between one or more of number of unmanned aerial vehicles 214 or other platforms and are coordinated through communication between unmanned aerial vehicles in number of unmanned aerial vehicles 214. In this implementation, aerial survey system 208 may generate routes 250 using decentralized control methods.

For example, unmanned aerial vehicle 230 may fly route 232 in routes 250 over forest 204 to generate information 202. In performing aerial survey 206 for forest 204, cloud cover 226 from number of clouds 228 may be present over forest 204.

Number of clouds 228 in cloud cover 226 may reduce information level 238 of some portions of information 202 where number of clouds 228 is present. In particular, gaps 248 may be present in number of clouds 228 over number of locations 236 in forest 204.

For example, if light detection and ranging systems are used in number of unmanned aerial vehicles 214, information 202 derived from responses to laser beams directed toward area 246 in forest 204 may include information about number of clouds 228 rather than forest 204. If the quality of information 202 about forest 204 is low enough, then information 202 may not have information level 238 at a desired level. This information may take the form of a level of desired quality for information 202. Information level 238 for quality of information 202 may be measured in different ways. For example, information 202 may have information level 238 if a desired number of points on a per unit area of ground are present in point cloud 234.

In other illustrative examples, information level 238 may be measured by the intensity of the responses detected by sensor system 242. Further, information level 238 may be determined by the signal-to-noise ratio, level of contrast, or other suitable parameters.

In still other illustrative examples, information level 238 may be measured by the desired space between points in point cloud 234. In this case, more accurate data may be needed and thus, a shorter distance between points in point cloud 234 may be desired. To achieve a shorter distance between points in point could 234, information level 238 may have a desired level with sensor system 242 scanning a smaller area at a time as unmanned aerial vehicle 230 performs aerial survey 206 over forest 204. In other words, sensor system 242 may scan forest 204 with a smaller field of view to provide information level 238 at a desired level.

In particular, this reduction of information level 238 may result in resolution 239 for point cloud 234 being lower than a point cloud threshold for point cloud 234. In these illustrative examples, resolution 239 of point cloud 234 is lower than the point cloud threshold when different parameters cannot be determined as accurately as desired from point cloud 234. An example of this may be when at least one of canopy height, forest stocking density, or other information about the forest cannot be identified due to resolution 239 of point cloud 234 being lower than the point cloud threshold.

In these illustrative examples, in generating route 232, survey controller 212 is configured to identify a number of locations 236 over the forest 204 in which an effect of cloud cover 226 on information level 238 generated about forest 204 by unmanned aerial vehicle 230 is reduced. This identification of number of locations 236 may occur dynamically.

Thus, route 232 may not be fixed and may be dynamic depending on number of locations 236 in which cloud cover 226 allows resolution 239 of point cloud 234 generated from information 202 by unmanned aerial vehicle 230 to be greater than the point cloud threshold. In other words, route 232 in routes 250 takes the form of dynamic route 244 in these illustrative examples.

In these examples, number of locations 236 may be locations in which number of clouds 228 are absent. In yet other illustrative examples, number of locations 236 may be locations in which one or more of number of clouds 228 are present, but those clouds in number of clouds 228 have characteristics that allow for information 202 for point cloud 234 to have resolution 239 that meets or exceeds the point cloud threshold. Resolution 239 may meet or exceed the point cloud threshold even though number of clouds 228 may be present in number of locations 236.

As depicted, survey controller 212 is configured to identify movement or other changes in number of clouds 228 in cloud cover 226 that cause changes in number of locations 236. Survey controller 212 is configured to generate route 232 for unmanned aerial vehicle 230. The generation of route 232 may be performed dynamically. In other words, when survey controller 212 generates route 232, the generation of route 232 may include the initial selection of route 232, a modification to route 232, or some other change to route 232.

Thus, route 232 may be changed while unmanned aerial vehicle 230 performs aerial survey 206. More specifically, the generation of route 232 for unmanned aerial vehicle 230 by survey controller 212 may occur in response to an event such as the identification of number of locations 236. The generation of route 232 for unmanned aerial vehicle 230 by survey controller 212 may also occur in response to an event in which number of locations 236 change periodically, continuously, or in some other suitable manner.

As depicted, survey controller 212 may dynamically generate route 232 in three dimensions. Route 232 may be a three-dimensional route in these illustrative examples. In one illustrative example, survey controller 212 may change route 232 in three dimensions to reduce the effect of cloud cover 226 on information level 238 of information 202 generated by unmanned aerial vehicle 230.

For example, when generating dynamic route 244, survey controller 212 may adjust the altitude of unmanned aerial vehicle 230 in addition to navigating unmanned aerial vehicle 230 to number of locations 236 where clouds may be absent. In this case, the altitude of unmanned aerial vehicle 230 may be reduced such that information level 238 for point cloud 234 has a desired level by limiting the field of view for sensor system 242. In other illustrative examples, small patches of cloud cover may indicate that unmanned aerial vehicle 230 should fly below number of clouds 228 for a short period of time and then change altitudes. In other words, route 232 may be adjusted such that unmanned aerial vehicle 230 may fly under number of clouds 228 and return to above number of clouds 228 when number of clouds 228 have moved. This strategy may be useful when a small patch in number of clouds 228 does not move because of the lack of wind.

In some cases, cloud information 240 may be received such that cloud information 240 remains accurate for the performance of aerial survey 206. In some illustrative examples, cloud information 240 may be received only once or intermittently. In this case, survey controller 212 may predict number of locations 236 over time over forest 204 based on cloud information 240 as received.

In these illustrative examples, if one or more additional unmanned aerial vehicles in number of unmanned aerial vehicles 214 are used to perform aerial survey 206 for area 246 in forest 204, those unmanned aerial vehicles may be controlled by survey controller 212 to cover all of area 246. This control may be performed to reduce or eliminate overlap in the generation of information 202 within area 246 in forest 204. In this particular example, survey controller 212 generates routes 250 as dynamic routes 254 for the unmanned aerial vehicles in number of unmanned aerial vehicles 214.

In other illustrative examples, number of unmanned aerial vehicles 214 used to perform aerial survey 206 may be group of autonomous unmanned aerial vehicles 216 that operate as swarm 218 or group of swarms 220 to generate information 202 for area 246 in forest 204. In this manner, group of unmanned aerial vehicles 216 may cooperate with each other to generate and dynamically modify routes 250 such that information 202 is generated in area 246 as efficiently as possible.

In this particular example, group of autonomous unmanned aerial vehicles 216 are configured to generate routes 250 as dynamic routes 254. With this particular example, survey controller 212 may be located in one or more of group of autonomous unmanned aerial vehicles 216. As a result, overlap in the generation of information 202 for a particular portion of area 246 may be reduced or avoided. Further, routes 250 may be generated and modified such that the amount of time needed to perform aerial survey 206 may be reduced.

In these illustrative examples, survey controller 212 is configured to continuously generate dynamic routes 254. For example, dynamic routes 254 may be generated as number of unmanned aerial vehicles 214 are flying. In some cases, pre-planned routes may be generated based on the current state of cloud cover 226 and, in particular, based on the locations of gaps 248 in number of clouds 228.

As number of clouds 228 move, routes 250 may be changed as part of the generation of routes 250 dynamically for dynamic routes 254. Thus, dynamic routes 254 may be dynamic in a number of different ways. In some cases, dynamic routes 254 may be generated as number of unmanned aerial vehicles 214 fly to perform aerial survey 206. In other words, routes 250 may not be complete for all of aerial survey 206 before unmanned aerial vehicles 214 begin to fly over forest 204. Instead, routes 250 are generated as number of unmanned aerial vehicles 214 fly. Routes 250 are generated during flight based on information 202 generated by number of unmanned aerial vehicles 214 and the movement of number of clouds 228 in which gaps 248 are present over number of locations 236.

In other illustrative examples, routes 250 may be pre-planned based on the current location of number of clouds 228 and a prediction of their movement. Routes 250 may then be modified as part of generating routes 250 based on actual movement of number of clouds 228 or changes in the prediction of movement of number of clouds 228 over forest 204.

Survey controller 212 may use a probabilistic model to predict movement of number of clouds 228 in these illustrative examples. For example, survey controller 212 may use a discrete Markov model or other suitable types of models. As a result, survey controller 212 may predict movement of number of clouds 228 such that routes 250 may be generated where number of clouds 228 are absent.

In these illustrative examples, the identification of number of locations 236 may be performed using cloud information 240. Cloud information 240 may be generated using sensor system 242. Cloud information 240 may take various forms such as images, maps, and other suitable types of information. Sensor system 242 may include at least one of a satellite, a ground-based all sky imager, a camera system in an aircraft, a camera system in unmanned aerial vehicle 230, a radar system, and other suitable types of sensors configured to generate cloud information 240.

The illustration of aerial survey environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in other illustrative examples, aerial survey system 208 may include other types of vehicles other than those in unmanned aerial vehicle fleet 210. As an example, manned aerial vehicles also may aid in performing aerial survey 206. In still other illustrative examples, sensor system 242 also may be considered part of aerial survey system 208.

As another illustrative example, aerial survey 206 performed using aerial survey system 208 may be performed over other types of land in addition to or in place of forest 204. For example, area 246 may include other types of land. The different types of land that may be surveyed may include, for example, without limitation, a city, a farm, a desert, a mountain, a prairie, or some other suitable type of land. Further, the aerial survey may be performed for bodies of water, such as a river, a pond, a lake, a sea, an ocean, and other suitable types of bodies of water.

Moreover, aerial survey 206 may be used to perform other types of operations other than a forest inventory survey. For example, aerial survey 206 may be used to perform flood plain mapping, small-scale, high-density terrain modeling, state-wide surveys, biomass estimation, bare-earth modeling, transportation mapping, power line and gas line mapping, catenary model generation, vegetative critical distance analysis, communications infrastructure planning, emergency route planning, asset management, three-dimensional urban mapping, shallow water mapping, or other suitable operations using a sensor system such as sensor system 242.

Thus, the illustrative embodiments may perform aerial survey 206 to generate point cloud 234 with resolution 239 that meets point cloud threshold 243 more cost effectively than with currently used methods. When resolution 239 is equal to or greater than point cloud threshold 243, point cloud 234 may have a desired level of quality or resolution. In these illustrative examples, point cloud threshold 243 may vary depending on the particular application. For example, with other applications as described above, point cloud threshold 243 may be different as compared to that for forest 204.

Survey controller 212 may generate route 232 for unmanned aerial vehicle 230 such that dynamic route 244 takes into account changes in the environment around unmanned aerial vehicle 230. In this manner, survey controller 212 may adjust route 232 in three dimensions. With the use of survey controller 212 and unmanned aerial vehicle 230, a more complete point cloud may be generated for forest 204 at a lower cost than with currently used methods.

In other illustrative examples, operation of swarm 218 to perform aerial survey 206 may result in cost savings. For example, a less expensive, smaller, and lighter sensor may be used in sensor system 242 for swarm 218. With a smaller sensor, an unmanned aerial vehicle may need to fly at a lower altitude to achieve information level 238 with a desired level for point cloud 234.

With the use of swarm 218, each unmanned aerial vehicle may fly at lower altitudes and achieve information level 238 with a desired level for point cloud 234 while decreasing the time it takes to generate point cloud 234. The use of swarm 218 may also result in the use of smaller unmanned aerial vehicles that may use less fuel and perform more efficient flying operations than with larger unmanned aerial vehicles. Thus, aerial survey 206 performed by swarm 218 may result in cost savings from fuel, light detection and ranging system (LiDAR) sensor equipment, aerial platform equipment, transportation of equipment, survey duration, or other sources. In this example, survey controller 212 may be equipped with components to integrate data streams from each sensor system in each unmanned aerial vehicle in swarm 218.

Figure 3:
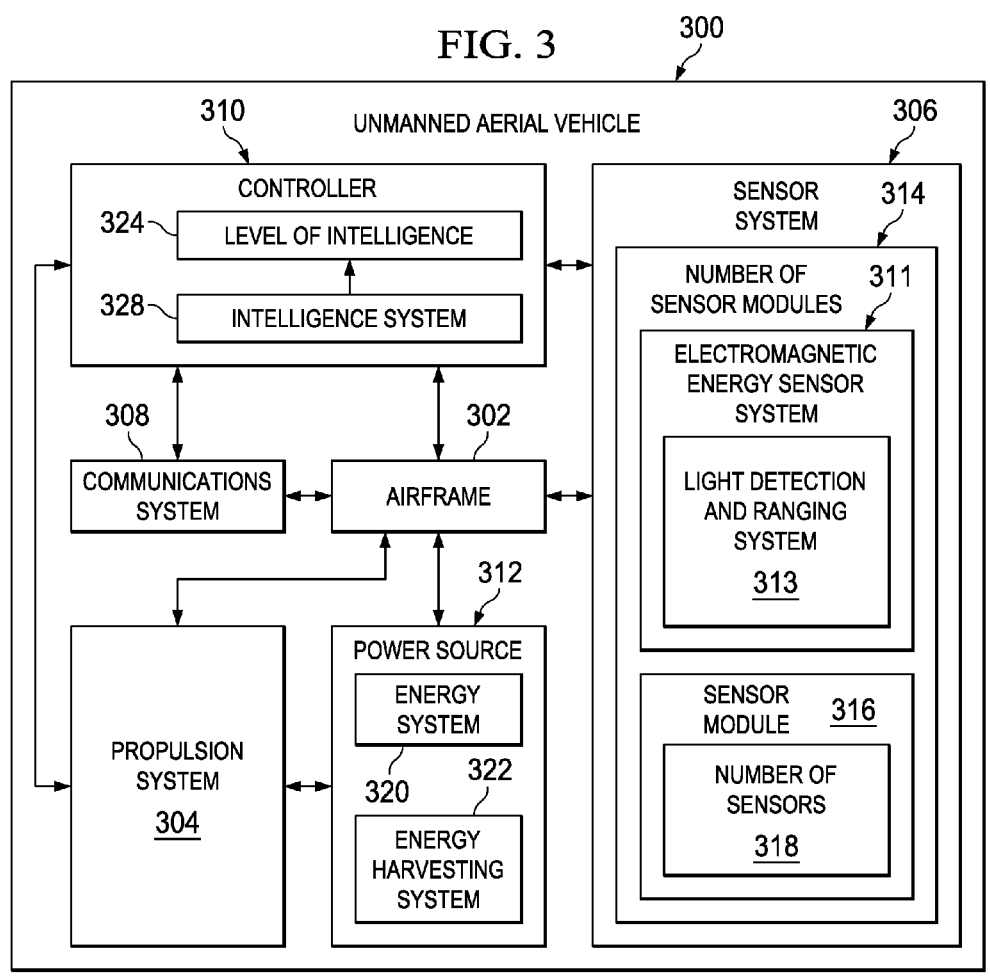
FIG. 3 is an illustration of a block diagram of an unmanned aerial vehicle in accordance with an illustrative embodiment.

Turning now to FIG. 3, an illustration of a block diagram of an unmanned aerial vehicle is depicted in accordance with an illustrative embodiment. In this depicted example, unmanned aerial vehicle 300 is an example of one implementation for an unmanned aerial vehicle in number of unmanned aerial vehicles 214 in unmanned aerial vehicle fleet 210 in FIG. 2. Unmanned aerial vehicle 300 may be used to implement unmanned aerial vehicle 106 and unmanned aerial vehicle 108 in FIG. 1.

In this illustrative example, unmanned aerial vehicle 300 includes a number of different components. For example, unmanned aerial vehicle 300 includes airframe 302, propulsion system 304, sensor system 306, communications system 308, controller 310, and power source 312.

Airframe 302 provides a structure for physical support of the other components in unmanned aerial vehicle 300. Airframe 302 may be a fuselage, wings, stabilizers, ailerons, rudders, and other structures suitable types of structures.

Propulsion system 304 is associated with airframe 302 and is configured to provide movement for unmanned aerial vehicle 300. When one component is "associated" with another component, the association is a physical association in these depicted examples.

For example, a first component, propulsion system 304, may be considered to be associated with a second component, airframe 302, by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

Propulsion system 304 may take various forms. For example, propulsion system 304 may include at least one of a number of engines and a number of propellers. In other examples, propulsion system 304 may be a jet engine, a turbojet, or some other suitable type of propulsion system for moving unmanned aerial vehicle 300.

Sensor system 306 is a system associated with airframe 302. Sensor system 306 is configured to generate information about the environment around unmanned aerial vehicle 300. Sensor system 306 may include many different types of sensors.

In this particular example, sensor system 306 includes electromagnetic energy sensor system 311. Electromagnetic energy sensor system 311 may be any sensor system configured to detect electromagnetic energy. In this illustrative example, electromagnetic energy sensor system 311 may be light detection and ranging system 313.

Light detection and ranging system 313 may scan area 246 with a laser beam. Light detection and ranging system 313 may detect the electromagnetic energy from the objects in forest 204 in FIG. 2. In these illustrative examples, this electromagnetic energy may be a response to a pulse of the laser beam. In particular, the response may take the form of one or more returns.

Light detection and ranging system 313 may take various forms when used for aerial surveys. For example, light detection and ranging system 313 may be a single return light detection and ranging system or may be a multiple return light detection and ranging system capable of detecting multiple returns. In these illustrative examples, the return is a response from a laser pulse.

Furthermore, light detection and ranging system 313 may measure intensity of the returned signal for each return. Of course, light detection and ranging system 313 may be implemented using any type of light detection and ranging system that may be suitable for performing aerial surveys.

In these illustrative examples, sensor system 306 may include number of sensor modules 314. In this example, a sensor module in number of sensor modules 314 is removable. In other words, one sensor module may be swapped out for another sensor module in number of sensor modules 314 in sensor system 306 in unmanned aerial vehicle 300.

In this manner, creator versatility may be provided for unmanned aerial vehicle 300. In particular, a sensor module in number of sensor modules 314 may be selected for use by unmanned aerial vehicle 300 depending on the mission or task assigned to unmanned aerial vehicle 300. Further, with the use of number of sensor modules 314, the weight of unmanned aerial vehicle 300 may be reduced by reducing the number of sensors in sensor system 306 only to those needed for a particular mission or task.

For example, sensor module 316 may be comprised of number of sensors 318. The composition of number of sensors 318 may be selected for the particular type of mission or task to be performed. Other sensors that may be included in sensor system 306 include at least one of a global positioning system receiver, a camera system, a visible light camera, an infrared camera, a multispectral camera, a hyperspectral camera, a radar system, and other suitable types of sensors. When a radar system is used, a synthetic aperture radar (SAR) system may be implemented for sensor system 306 in these illustrative examples.

Communications system 308 is associated with airframe 302. As depicted, communications system 308 is configured to provide communications between unmanned aerial vehicle 300 and another device. The other device may be, for example, survey controller 212, number of unmanned aerial vehicles 214 in unmanned aerial vehicle fleet 210, sensor system 242, and other suitable components shown in FIG. 2. The communications may be wireless communications in these illustrative examples. In some cases, a wired communications interface may also be present.

Power source 312 is associated with airframe 302. Power source 312 is configured to provide power for the other components in unmanned aerial vehicle 300. Power source 312 may take a number of different forms. For example, power source 312 may include at least one of energy system 320 and energy harvesting system 322.

In this illustrative example, energy system 320 may include one or more batteries. These batteries may be modular and replaceable. In other illustrative examples, energy system 320 may be at least one of a fuel cell, fuel in a fuel tank, and some other suitable type of energy system.

Energy harvesting system 322 is configured to generate power for components in unmanned aerial vehicle 300 from the environment around unmanned aerial vehicle 300. For example, energy harvesting system 322 may include at least one of a solar cell, a micro wind turbine generator, and other suitable types of energy harvesting systems that generate power from the environment around unmanned aerial vehicle 300 while unmanned aerial vehicle 300 is in flight, on the ground, or a combination of the two.

In this illustrative example, controller 310 is associated with airframe 302. As depicted, controller 310 takes the form of hardware and may include software.

Controller 310 is configured to control the operation of unmanned aerial vehicle 300. Controller 310 may provide level of intelligence 324. Level of intelligence 324 may vary depending on the particular implementation of unmanned aerial vehicle 300. In some illustrative examples, controller 310 may be considered part of survey controller 212 in FIG. 2.

In some cases, level of intelligence 324 may be such that controller 310 receives specific commands. These commands may include, for example, without limitation, a direction of travel, a waypoint, when to generate information 202 in FIG. 2 using sensor system 306, and other similar commands.

In other illustrative examples, level of intelligence 324 may be higher such that unmanned aerial vehicle 300 may receive a task. In these illustrative examples, a task is a piece of work that is performed. The task may be part of a mission. In these examples, a task may be comprised of operations that are performed for the piece of work. For example, a task may be to scan a particular location in forest 204 in FIG. 2. Another task may be to travel to the particular location in forest 204.

Controller 310 may identify operations for performing the task. This task may be a fixed task in which unmanned aerial vehicle 300 follows a path in a particular area to generate information 202 using sensor system 306.

In other illustrative examples, level of intelligence 324 may be even higher such that unmanned aerial vehicle 300 is configured to communicate with other unmanned aerial vehicles to coordinate performing one or more tasks. For example, controller 310 may include a circuit, a computer program, an artificial intelligence system, and other suitable types of processes that may provide a desired level for level of intelligence 324.

In these illustrative examples, intelligence system 328 may provide level of intelligence 324. Intelligence system 328 may use an expert system, a neural network, fuzzy logic, or some other suitable type of system to provide level of intelligence 324.

Level of intelligence 324 in controller 310 may allow for functions such as dynamic route planning. In this manner, obstacles may be identified along a route and may therefore be avoided. This identification and avoidance of obstacles may be performed in real time. These obstacles may include, for example, without limitation, another manned or unmanned aerial vehicle, a mountain side, a tree, and other obstacles.

Controller 310 also may monitor health of different systems in unmanned aerial vehicle 300. For example, controller 310 may monitor a level of energy being provided or remaining in power source 312. If power source 312 only includes batteries in energy system 320, controller 310 may direct unmanned aerial vehicle 300 to return to base for the recharging or exchange of batteries.

The illustration of unmanned aerial vehicle 300 in FIG. 3 is not meant to imply limitations to the manner in which unmanned aerial vehicle 300 may be implemented. In other illustrative examples, unmanned aerial vehicle 300 may include other components in addition to or in place of the ones depicted.

For example, sensor system 306 may optionally include other components in addition to number of sensor modules 314. As an example, sensor system 306 may include a vibration dampening system, a cooling system, additional power sources, or other suitable components.

Further, although electromagnetic energy sensor system 311 has been shown as light detection and ranging system 313, electromagnetic energy sensor system 311 may be any sensor system configured to detect electromagnetic energy. For example, electromagnetic energy sensor system 311 may be a photonics sensor, a stereographic camera, a light detection and ranging system, a radio detection and ranging system, a radio frequency sensor system, an electro-optical sensor system, or some other suitable type of sensor system.

Additionally, although energy harvesting system 322 is included in power source 312 in unmanned aerial vehicle 300 in these illustrative examples, energy harvesting system 322 may be part of a charging station in other illustrative examples. In this case, energy harvesting system 322 may be configured to generate energy and store that energy until unmanned aerial vehicle 300 returns to the charging station.

When unmanned aerial vehicle 300 is operated in swarm 218, unmanned aerial vehicle 300 may include a different type of sensor system for sensor system 306 than other unmanned aerial vehicles in swarm 218 in FIG. 2. For example, unmanned aerial vehicle 300 may include light detection and ranging system 313 while another unmanned aerial vehicle in swarm 218 may include a synthetic aperture radar system. In this case, information from each sensor system in each unmanned aerial vehicle in swarm 218 may be combined using data fusion techniques. In this manner, swarm 218 may perform different types of functions using different types of sensor systems substantially concurrently, depending on the particular implementation.

Figure 4:
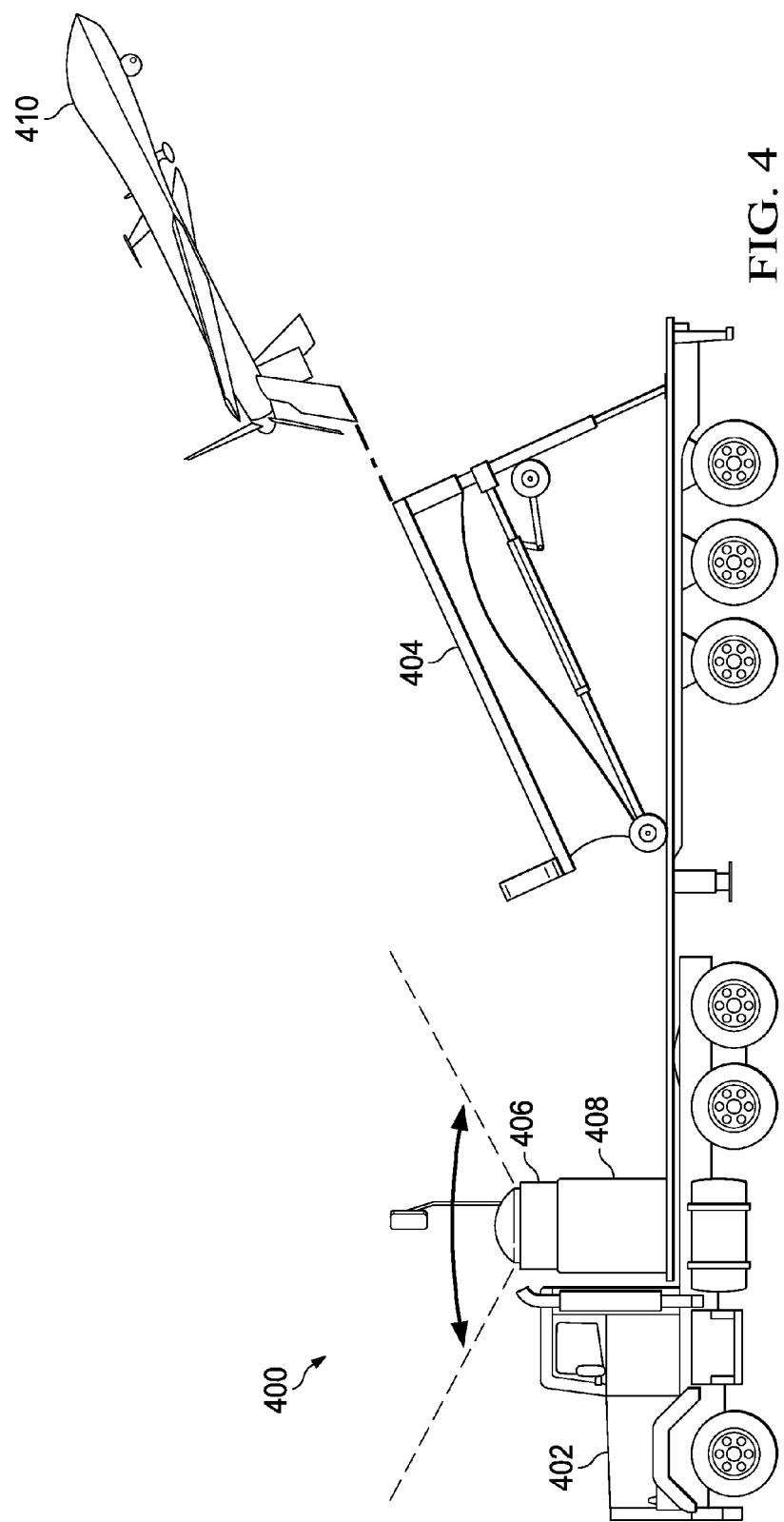
FIG. 4 is an illustration of an aerial survey system in accordance with an illustrative embodiment.

Turning now to FIG. 4, an illustration of an aerial survey system is depicted in accordance with an illustrative embodiment. In this depicted example, aerial survey system 400 is an example of one implementation for aerial survey system 208 in FIG. 2. In this illustrative example, aerial survey system 400 comprises truck 402, unmanned aerial vehicle launcher 404, all sky imager 406, survey controller 408, and unmanned aerial vehicle 410.

Truck 402 provides mobility for aerial survey system 400. Unmanned aerial vehicle launcher 404 is associated with truck 402 and may be positioned to launch unmanned aerial vehicle 410 or receive unmanned aerial vehicle 410 when unmanned aerial vehicle 410 lands. All sky imager 406 is an example of an implementation for sensor system 242 in FIG. 2.

All sky imager 406 may generate images of the sky and those images or maps generated by all sky imager 406 may be used by survey controller 408 to generate a route for unmanned aerial vehicle 410 to perform a survey over a forest. In these illustrative examples, all sky imager 406 may include edge detection software that may be used to identify the edges of clouds. The identification of the edges of clouds may be used to more easily identify the location of the clouds in images generated by all sky imager 406.

The illustration of aerial survey system 400 in FIG. 4 is not meant to imply physical or architectural limitations to the manner in which different aerial survey systems may be implemented. For example, the aerial survey system illustrated in FIG. 1 includes components that are distributed with some of the components in fixed locations. In other illustrative examples, an aerial survey system may be implemented using other mobile platforms such as a ship, an aircraft, or other suitable types of platforms.

Figure 5:
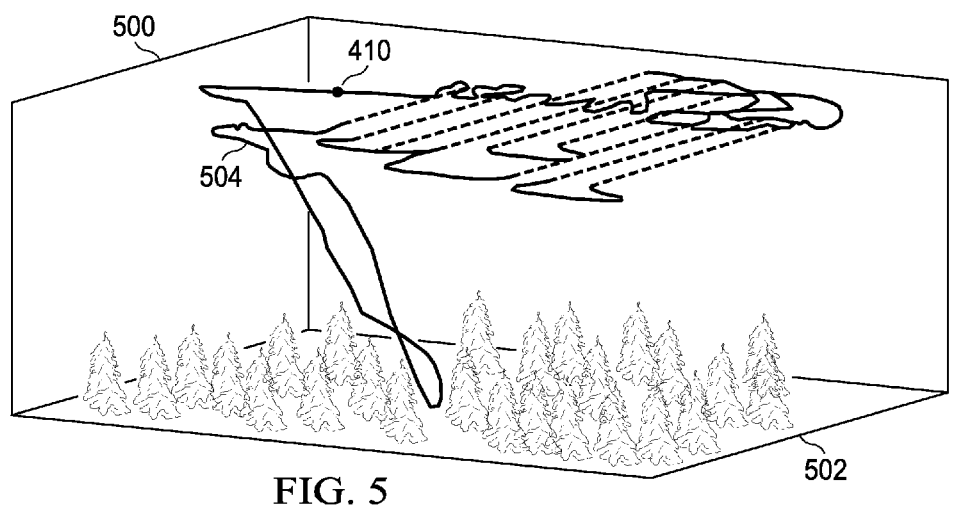
FIG. 5 is an illustration of a route for performing an aerial survey in accordance with an illustrative embodiment.

With reference now to FIG. 5, an illustration of a route for performing an aerial survey is depicted in accordance with an illustrative embodiment. In this depicted example, volume 500 represents the airspace in which unmanned aerial vehicle 410 may fly to generate information about forest 502.

In this illustrative example, route 504 is a planned route for unmanned aerial vehicle 410. This route may be used if cloud cover is not present in a manner that prevents a desired collection of information about forest 502. In some illustrative examples, route 504 may be generated to take into account clouds currently over forest 502 and predicted movement of the clouds.

Figure 6:
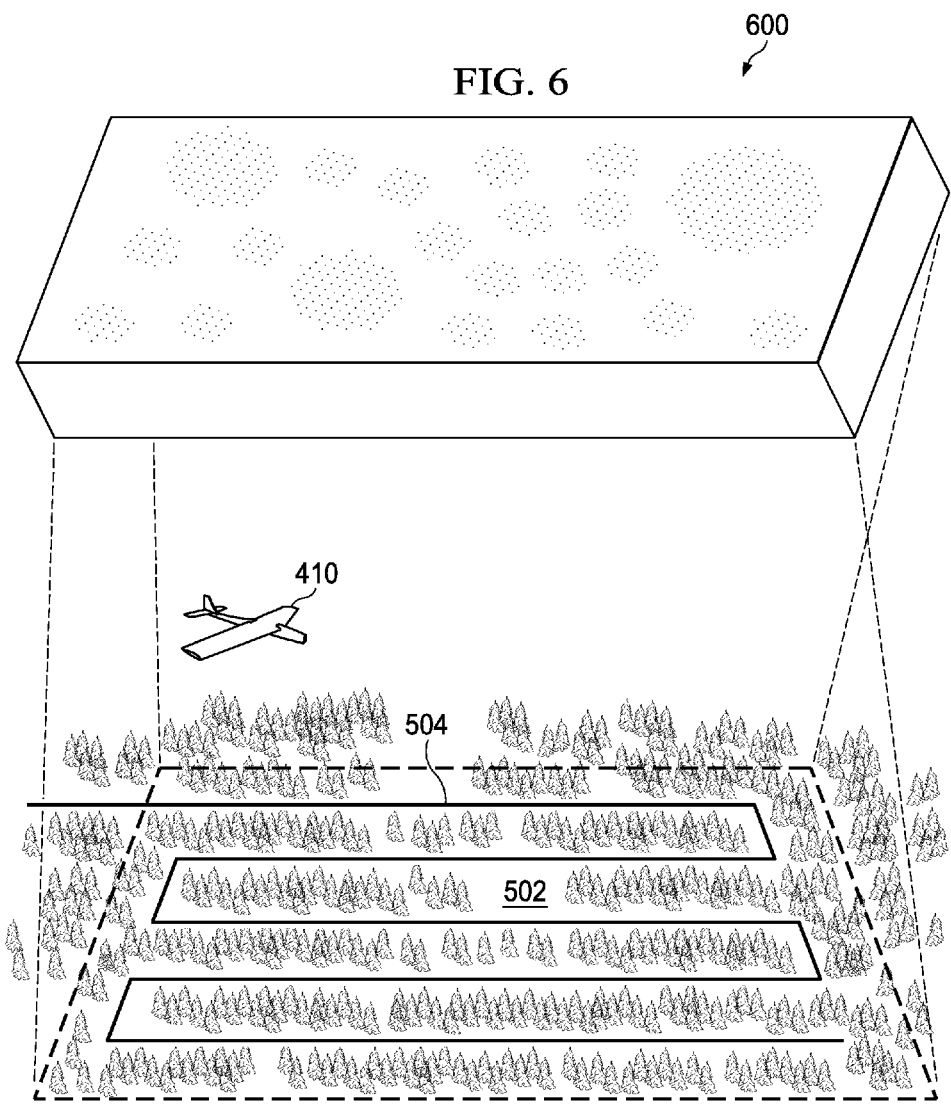
FIG. 6 is an illustration of a route of an unmanned aerial vehicle through a forest in accordance with an illustrative embodiment.

With reference now to FIG. 6, an illustration of a route of an unmanned aerial vehicle through a forest is depicted in accordance with an illustrative embodiment. In this depicted example, point cloud 600 is an example of a point cloud generated for forest 502 using route 504 when clouds over forest 502 are absent.

In this illustrative example, cloud cover is not present over forest 502. As a result, route 504 does not need adjustment to generate point cloud 600. Route 504 is static because clouds are not present.

As a result, unmanned aerial vehicle 410 flies route 504 as originally generated. In this illustrative example, point cloud 600 is shown over forest 502 and is an example of information that may be generated by unmanned aerial vehicle 410 flying route 504 over forest 502. Of course, point cloud 600 is a representation of the information that may be generated and is not physically located over forest 502.

Figure 7:
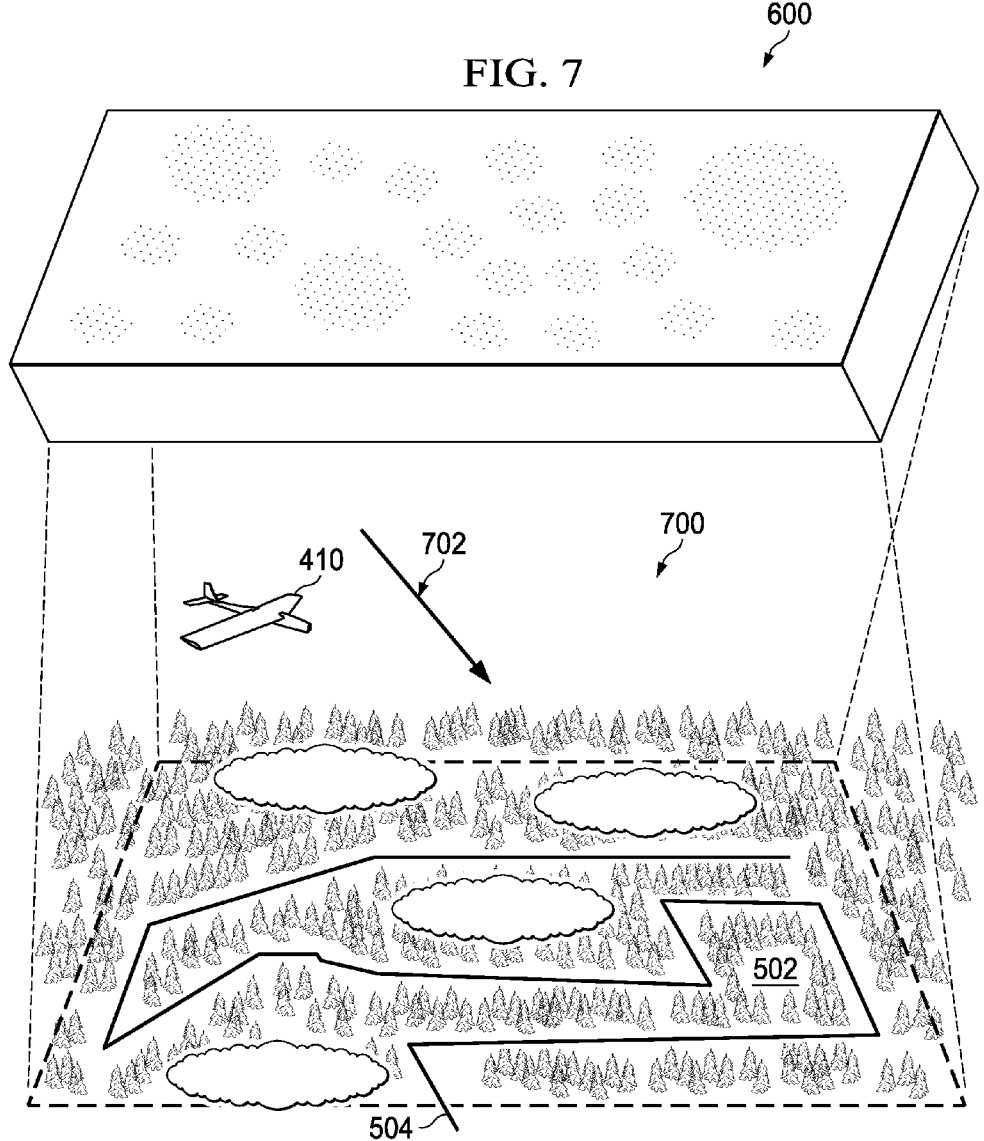
FIG. 7 is an illustration of a route of an unmanned aerial vehicle through a forest in the presence of clouds in accordance with an illustrative embodiment.

Turning now to FIG. 7, an illustration of a route of an unmanned aerial vehicle through a forest in the presence of clouds is depicted in accordance with an illustrative embodiment. In this illustrative example, clouds 700 are present over forest 502. Clouds 700 may prevent the generation of point cloud 600 with a desired level of quality. As a result, gaps in point cloud 600 may be present.

In this example, route 504 is modified as shown from route 504 shown in FIG. 5 and is a dynamic route in this example. Route 504 may be considered a modification of route 504 from its original form or may be an entirely new route that is generated as unmanned aerial vehicle 410 flies over forest 502. In these illustrative examples, point cloud 600 of forest 502 may be generated as desired with the modification of route 504 to fly over locations in forest 502 in which clouds 700 are absent.

As depicted, clouds 700 move in the direction of arrow 702 because of wind in the area. In these illustrative examples, route 504 of unmanned aerial vehicle 410 may be adjusted to fly over locations where clouds 700 are absent to generate information for point cloud 600.

Figure 8:
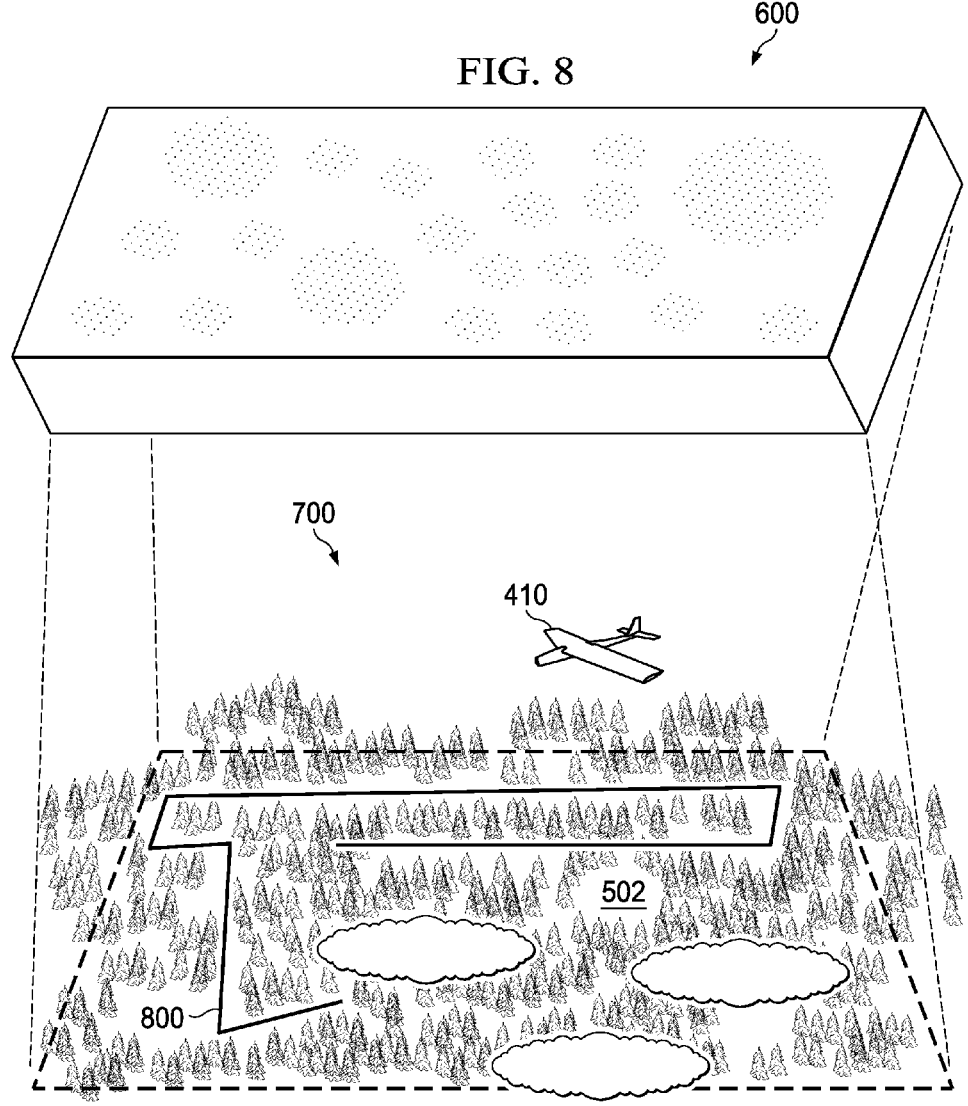
FIG. 8 is another illustration of a route of an unmanned aerial vehicle through a forest in the presence of clouds in accordance with an illustrative embodiment.

Turning now to FIG. 8, another illustration of a route of an unmanned aerial vehicle through a forest in the presence of clouds is depicted in accordance with an illustrative embodiment. In this example, clouds 700 have shifted such that other locations are now not covered by clouds 700. As a result, route 504 for unmanned aerial vehicle 410 may be changed to route 800 such that unmanned aerial vehicle 410 flies over locations in forest 502 that have gaps in clouds 700 to generate information for point cloud 600.

The adjustment of route 504 to route 800 for unmanned aerial vehicle 410 may be done dynamically using current information about clouds 700. This current information may be generated through a sensor system. In other illustrative examples, if the information about clouds 700 is only generated once or not as frequently as desired for routing the unmanned aerial vehicle, predictions may be made as to the movement of clouds 700.

In these illustrative examples, this prediction may be made based on the direction of movement of clouds 700 from weather forecasts. These weather forecasts include information about winds and amounts of clouds that may be present during the performance of an aerial survey by unmanned aerial vehicle 410.

In this illustrative example, route 504 and route 800 may result in increased coverage of forest 502 during the aerial survey. In some illustrative examples, route 800 may be generated substantially concurrently with route 504 by predicting movement of clouds 700. In this manner, route 504 is flown by unmanned aerial vehicle 410 first and then route 800 is flown by unmanned aerial vehicle 410.

In other illustrative examples, conditions of clouds 700 may change before route 504 is completed in its original form. With the use of an illustrative embodiment, route 504 may be changed to route 800 or modified in some other manner, depending on the particular implementation. When clouds 700 move again, route 800 may return to route 504 or the survey controller may generate a different route in these illustrative examples. In this manner, the use of multiple routes results in the generation of an optimal flight plan strategy based on changing cloud conditions in these illustrative examples.

The different components shown in FIG. 1 and FIGS. 4-8 may be combined with components in FIGS. 2-3, used with components in FIG. 2-3, or a combination of the two. Additionally, some of the components in FIG. 1 and FIGS. 4-8 may be illustrative examples of how components shown in block form in FIGS. 2-3 can be implemented as physical structures.

Figure 9:
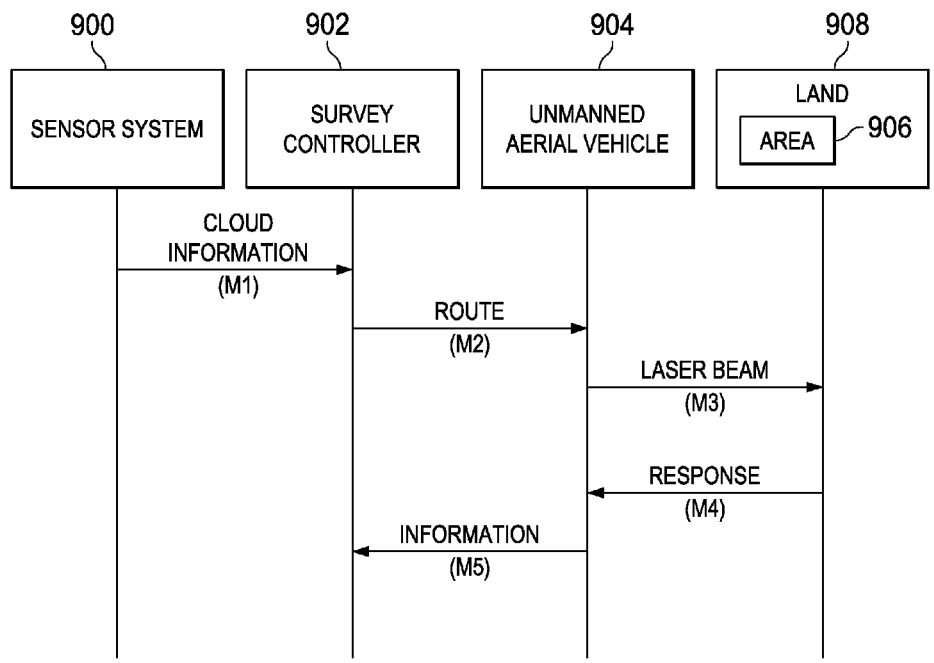
FIG. 9 is an illustration of a message flow diagram for an aerial survey system performing a survey over an area of land in accordance with an illustrative embodiment.

Turning now to FIG. 9, an illustration of a message flow diagram for an aerial survey system performing a survey over an area of land is depicted in accordance with an illustrative embodiment. In this depicted example, message flow of information is depicted between components used to perform an aerial survey. The different components involved in performing an aerial survey include sensor system 900, survey controller 902, and unmanned aerial vehicle 904. These components are examples of components from aerial survey environment 200 in FIG. 2.

Survey controller 902 and unmanned aerial vehicle 904 are part of an aerial survey system that may perform a survey on area 906 of land 908. In this illustrative example, land 908 takes the form of a forest. Of course, land 908 may be any land area. For example, land 908 may also be farm land, a city, a field, or some other suitable land mass.

Sensor system 900 sends cloud information to survey controller 902 (message M1). In turn, survey controller 902 identifies locations over land 908 in which clouds in cloud cover are absent or do not prevent generation of information about land 908 with a desired level of quality. Survey controller 902 generates a route and sends the route to unmanned aerial vehicle 904 (message M2). Unmanned aerial vehicle 904 flies over area 906 of land 908 following the route received from survey controller 902. As unmanned aerial vehicle 904 flies over area 906, unmanned aerial vehicle 904 directs a laser beam at area 906 (message M3). A response to the laser beam is received from land 908 by unmanned aerial vehicle 904 (message M4). Unmanned aerial vehicle 904 generates information from the response received from land 908 in area 906. The information is sent to survey controller 902 (message M5).

This sequence of message flow may continue until all of area 906 has been surveyed. In these illustrative examples, the route changes as the clouds over area 906 change based on cloud information received from sensor system 900.

As depicted, survey controller 902 generates the routes such that unmanned aerial vehicle 904 reaches locations that have not been surveyed within area 906.

Figure 10:
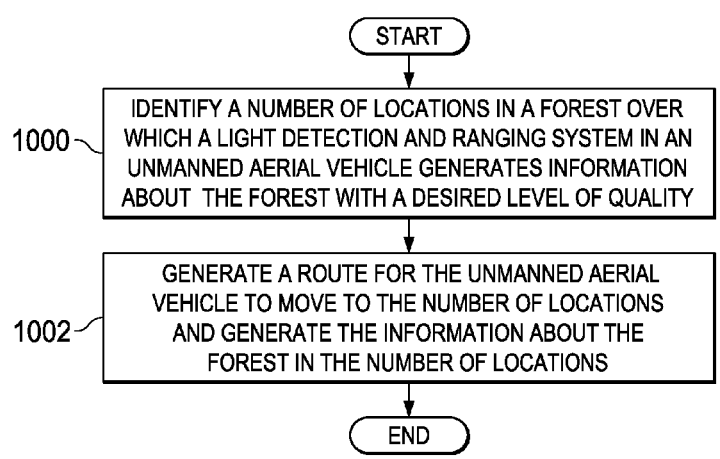
FIG. 10 is an illustration of a flowchart of a process for generating information about a forest in accordance with an illustrative embodiment.

With reference now to FIG. 10, an illustration of a flowchart of a process for generating information about a forest is depicted in accordance with an illustrative embodiment. The process illustrated in FIG. 10 may be implemented using aerial survey system 208 in FIG. 2.

In this illustrative example, the process begins by identifying a number of locations in a forest over which a light detection and ranging system in an unmanned aerial vehicle generates information about the forest with a desired level of quality (operation 1000). These locations are locations in which the light detection and ranging system in the unmanned aerial vehicle may generate information for a point cloud in which the information reflects a desired amount of information about the forest.

The process generates a route for the unmanned aerial vehicle to move to the number of locations and generate the information about the forest in the number of locations (operation 1002) with the process then returning to operation 1000. These two operations may be repeated until the aerial surveys are completed. In these illustrative examples, the generation of the route is performed such that the route does not change when no cloud cover is present. When cloud cover occurs or changes, the generation of the route includes changing the route to take into account the number of locations in which clouds are no longer present.

Figure 11:
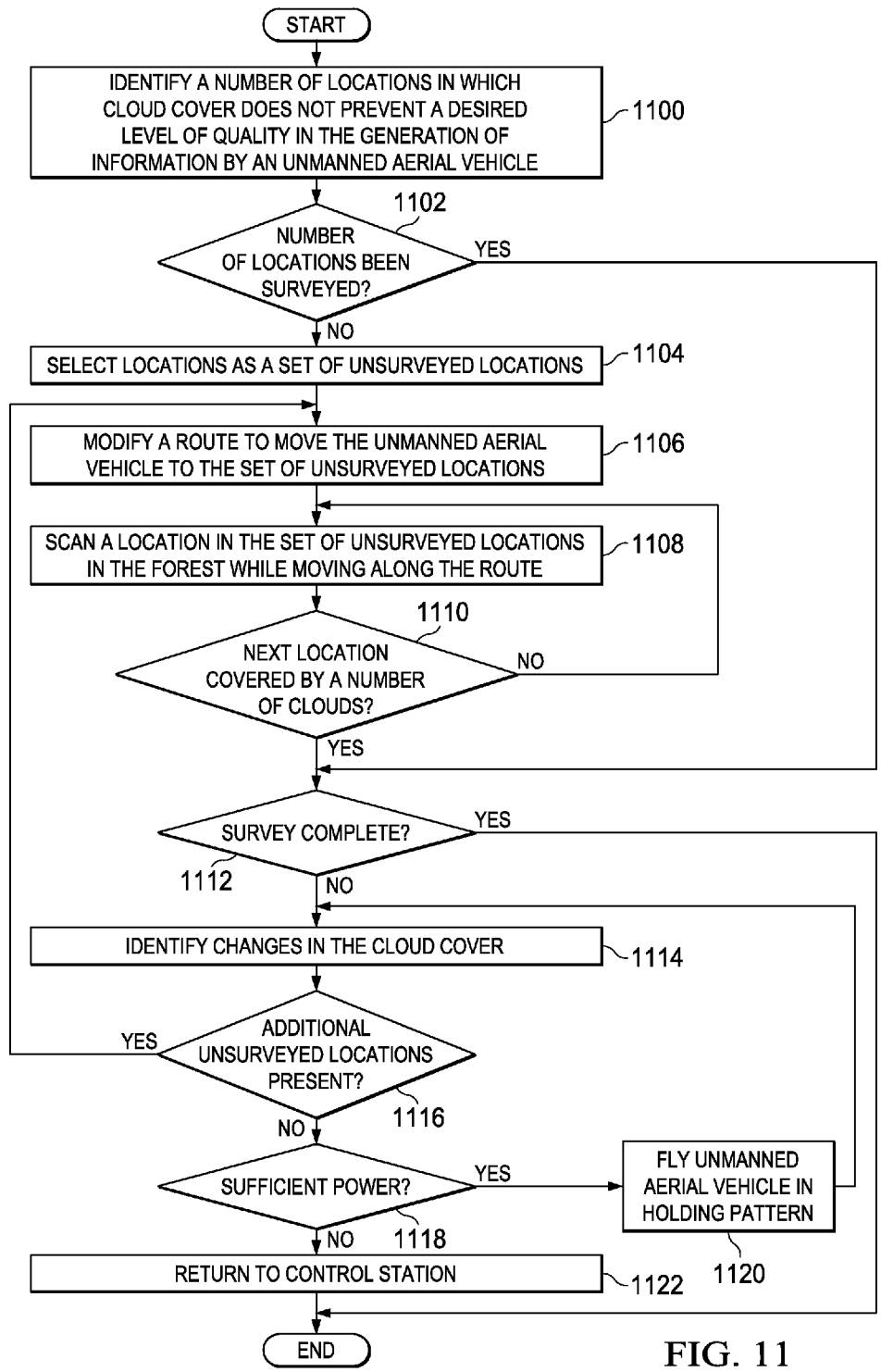
FIG. 11 is an illustration of a flowchart of a process for generating a route for an unmanned aerial vehicle in accordance with an illustrative embodiment.

With reference now to FIG. 11, an illustration of a flowchart of a process for generating a route for an unmanned aerial vehicle is depicted in accordance with an illustrative embodiment. The process illustrated in FIG. 11 may be implemented using aerial survey system 208 in FIG. 2. In particular, the process illustrated in FIG. 11 may be used to generate route 232 as dynamic route 244 in FIG. 2.

In this illustrative example, the process begins by identifying a number of locations in which cloud cover do not prevent the generation of information by an unmanned aerial vehicle with a desired level of quality (operation 1100). The number of locations may change each time operation 1100 is performed. The number of locations is one or more locations in which the clouds forming the cloud cover have a number of gaps. The number of gaps is such that information for a point cloud of a forest can be generated with a desired level of quality.

A determination is made as to whether any of the number of locations identified has been surveyed (operation 1102). If any of the number of locations has not been surveyed, those locations are selected as a set of unsurveyed locations (operation 1104). As used herein, a "set" when used with reference to items means one or more items. For example, a set of unsurveyed locations is one or more unsurveyed locations. The route is modified to move the unmanned aerial vehicle to the set of unsurveyed locations (operation 1106).

Next, the unmanned aerial vehicle scans a location in the set of unsurveyed locations in the forest while moving along the route (operation 1108). The scanning is performed with a laser beam from a light detection and ranging system to generate information for a point cloud for the forest while flying over the set of unsurveyed locations. In operation 1108, scanning may be performed using a photonics sensor, a stereographic camera, the light detection and ranging system, a radio detection and ranging system, a radio frequency sensor system, an electro-optical sensor system, and other suitable types of sensor systems that actively or passively detect electromagnetic energy. The information generated for creating the point cloud may vary depending on the type of electromagnetic energy sensor system used. For example, the information may include images and camera positioning with a stereographic camera. As another example, the information may be distance measurements and a location of the sensor when the sensor is a light detection and ranging system.

A determination is made as to whether a next location in the set of unsurveyed locations on the route is now covered by a number of clouds (operation 1110). This determination may be made using cloud information from a sensor system. The cloud information may be current or received in real time from the sensor system as fast as the cloud information can be sent without intentional delay. In other cases, predictions of cloud movement may be made from the cloud information if the cloud information is not updated as frequently as desired.

If the next location is not covered by a number of clouds, the process returns to operation 1108 as described above. Otherwise, a determination is made as to whether the survey is complete (operation 1112). The survey is complete in these illustrative examples if information has been collected over all of the area identified for the survey by the unmanned aerial vehicle.

If the survey of the location is not complete, changes in the cloud cover are identified (operation 1114). In operation 1114, a new number of locations in which cloud cover is not present is identified.

A determination is made as to whether additional unsurveyed locations are present in the forest based on the changes in the cloud cover (operation 1116). Additional unsurveyed locations may have become available for a survey due to cloud cover moving from those locations. If additional unsurveyed locations are present in the forest, the process returns to operation 1106 as described above. In this case, the modified route may instruct the unmanned aerial vehicle to fly over these unsurveyed locations and collect information about the number of locations.

If additional unsurveyed locations are not present, a determination is made as to whether the unmanned aerial vehicle has sufficient power to fly in a holding pattern (operation 1118). If the unmanned aerial vehicle has sufficient power, the unmanned aerial vehicle flies in a holding pattern until additional changes in the cloud cover in the number of locations occur (operation 1120). The process then proceeds to operation 1114 as described above.

If the unmanned aerial vehicle does not have sufficient power, the unmanned aerial vehicle returns to a control station (operation 1122) with the process terminating thereafter. With reference again to operation 1102, if the locations where cloud cover has changes have been surveyed the process proceeds to operation 1112 as described above. Returning to operation 1112, if the survey is complete, the process terminates.

Turning now to FIG. 12, an illustration of a block diagram of a data processing system is depicted in accordance with an illustrative embodiment. Data processing system 1200 may be used to implement computer system 222 in FIG. 2, survey controller 212 in FIG. 2, and controller 310 in FIG. 3. In this illustrative example, data processing system 1200 includes communications framework 1202, which provides communications between processor unit 1204, memory 1206, persistent storage 1208, communications unit 1210, input/output (I/O) unit 1212, and display 1214. In this example, communication framework may take the form of a bus system.

Processor unit 1204 serves to execute instructions for software that may be loaded into memory 1206. Processor unit 1204 may be a number of processors, a multi-processor core, or some other type of processor, depending on the particular implementation.

Memory 1206 and persistent storage 1208 are examples of storage devices 1216. A storage device is any piece of hardware that is capable of storing information, such as, for example, without limitation, data, program code in functional form, and/or other suitable information either on a temporary basis and/or a permanent basis. Storage devices 1216 may also be referred to as computer readable storage devices in these illustrative examples. Memory 1206, in these examples, may be, for example, a random access memory or any other suitable volatile or non-volatile storage device. Persistent storage 1208 may take various forms, depending on the particular implementation.

For example, persistent storage 1208 may contain one or more components or devices. For example, persistent storage 1208 may be a hard drive, a flash memory, a rewritable optical disk, a rewritable magnetic tape, or some combination of the above. The media used by persistent storage 1208 also may be removable. For example, a removable hard drive may be used for persistent storage 1208.

Communications unit 1210, in these illustrative examples, provides for communications with other data processing systems or devices. In these illustrative examples, communications unit 1210 is a network interface card.

Input/output unit 1212 allows for input and output of data with other devices that may be connected to data processing system 1200. For example, input/output unit 1212 may provide a connection for user input through a keyboard, a mouse, and/or some other suitable input device. Further, input/output unit 1212 may send output to a printer. Display 1214 provides a mechanism to display information to a user.

Instructions for the operating system, applications, and/or programs may be located in storage devices 1216, which are in communication with processor unit 1204 through communications framework 1202. The processes of the different embodiments may be performed by processor unit 1204 using computer-implemented instructions, which may be located in a memory, such as memory 1206.

These instructions are referred to as program code, computer usable program code, or computer readable program code that may be read and executed by a processor in processor unit 1204. The program code in the different embodiments may be embodied on different physical or computer readable storage media, such as memory 1206 or persistent storage 1208.

Program code 1218 is located in a functional form on computer readable media 1220 that is selectively removable and may be loaded onto or transferred to data processing system 1200 for execution by processor unit 1204. Program code 1218 and computer readable media 1220 form computer program product 1222 in these illustrative examples. In one example, computer readable media 1220 may be computer readable storage media 1224 or computer readable signal media 1226.

In these illustrative examples, computer readable storage media 1224 is a physical or tangible storage device used to store program code 1218 rather than a medium that propagates or transmits program code 1218.

Alternatively, program code 1218 may be transferred to data processing system 1200 using computer readable signal media 1226. Computer readable signal media 1226 may be, for example, a propagated data signal containing program code 1218. For example, computer readable signal media 1226 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 1200 are not meant to provide architectural limitations to the manner in which different embodiments may be implemented. The different illustrative embodiments may be implemented in a data processing system including components in addition to and/or in place of those illustrated for data processing system 1200. Other components shown in FIG. 12 can be varied from the illustrative examples shown. The different embodiments may be implemented using any hardware device or system capable of running program code 1218.

Thus, with one or more illustrative embodiments, an aerial survey of a forest may be performed more efficiently than with current techniques when clouds are present over the forest. With an illustrative embodiment, an aerial survey may be performed as part of a forest inventory mission to identify information about the forest. In these illustrative examples, the aerial survey may be used to generate a point cloud of the forest. A survey controller in one illustrative example is configured to generate a route for an unmanned aerial vehicle with a light detection and ranging system. The survey controller is configured to generate the route dynamically. In generating the route dynamically, an initial route may be generated based on the current cloud cover present. This route may move the unmanned aerial vehicle over locations where clouds are absent or the clouds allow for the generation of a point cloud over the forest with a desired level of quality.

With one or more illustrative examples, the survey controller may continue to generate the route as changes in cloud cover occur over the forest. This generation may include adjustments to the route as the clouds move and the locations where clouds are absent change. As described above, the identification of the changes in the cloud location may be performed using cloud information generated from a sensor system. The cloud information may be received in real time. In other cases, older cloud information may be used and a prediction of cloud movement may be made based on weather conditions such as wind and other suitable conditions. In this manner, increased portions of the forest may be surveyed to generate a point cloud that is more complete as compared to currently used techniques that do not adapt the route of the aerial vehicle.

Thus, one or more illustrative embodiments may reduce the cost for performing an aerial survey. This reduction in cost may occur with fewer reschedulings of an aerial survey due to cloud cover. Utilization of the sensor system may be optimized because the sensor system may be used on more days of the year than with currently used systems that do not operate as desired when cloud cover is present. Further, the illustrative examples also may provide a more complete point cloud for the forest by rerouting the unmanned aerial vehicle to take advantage of locations where the clouds are absent. Additionally, in taking into account movement of the clouds, the locations where clouds are absent may shift such that all of the forest may be surveyed by the unmanned aerial vehicle.

With the use of an illustrative embodiment, a more complete, accurate, and cost efficient forest inventory mission may be performed. As a result, forestry management may be enhanced with the use of information generated by an aerial survey system.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
an unmanned aerial vehicle;
an electromagnetic energy sensor system associated with the unmanned aerial vehicle, wherein the electromagnetic energy sensor system is configured to generate information about a forest; and
a survey controller configured to:
identify a number of locations over the forest in which an information level of the information generated about the forest by the electromagnetic energy sensor system is reduced by an effect of cloud cover,
generate a route for the unmanned aerial vehicle to move to the number of locations, and
continuously generate the route as changes in cloud cover occur over the forest;
wherein the route is based on a current location of a number of clouds and a prediction of movement of the number of clouds.

2. The apparatus of claim 1, wherein the survey controller is configured to control movement of the unmanned aerial vehicle over the number of locations using the route and control generation of the information about the forest in the number of locations.

3. The apparatus of claim 1, wherein the survey controller is configured to identify a change in the number of locations based on a change in cloud cover over the forest.

4. The apparatus of claim 1, wherein the survey controller is configured to identify the number of locations using cloud information about clouds over the forest.

5. The apparatus of claim 4, wherein the cloud information is generated by a sensor system selected from at least one of a satellite, an all sky imager, a camera system on the unmanned aerial vehicle, a camera system on an aircraft, and a radar system.

6. The apparatus of claim 3, wherein the route is a three-dimensional route and the route changes in three dimensions to reduce the effect of the cloud cover on the information level of the information generated by the electromagnetic energy sensor system.

7. The apparatus of claim 1 further comprising:
a sensor system associated with the unmanned aerial vehicle, wherein the electromagnetic energy sensor system is part of the sensor system and wherein the sensor system further includes a camera system and a global positioning system receiver.

8. The apparatus of claim 1, wherein the electromagnetic energy sensor system is selected from at least one of a photonics sensor, a stereographic camera, a light detection and ranging system, a radio detection and ranging system, a radio frequency sensor system, and an electro-optical sensor system.

9. The apparatus of claim 1, wherein the survey controller is located in at least one of the unmanned aerial vehicle and in a computer system in a remote location.

10. An aerial survey system comprising:
an unmanned aerial vehicle fleet; and
a survey controller configured to:
control generation of information about a number of locations in an area of land based on cloud cover over a number of locations of a forest,
identify a number of locations over the forest in which an information level of the information generated about the forest by the electromagnetic energy sensor system is reduced by an effect of cloud cover,
generate routes for the unmanned aerial vehicle fleet to move to the number of locations, and
continuously generate the routes as changes in cloud cover occur over the forest;
wherein the route is based on a current location of a number of clouds and a prediction of movement of the number of clouds.

11. The aerial survey system of claim 10, wherein the survey controller is located in at least one of the unmanned aerial vehicle fleet and a control station.

12. The aerial survey system of claim 10, wherein the unmanned aerial vehicle fleet is selected from one of an unmanned aerial vehicle and a group of autonomous unmanned aerial vehicles.

13. The aerial survey system of claim 12, wherein the group of autonomous unmanned aerial vehicles is configured to operate as a swarm in generating information about the number of locations in the area of land.

14. The aerial survey system of claim 10, wherein the area of land is selected from one of a forest, a city, a farm, a desert, a mountain, and a prairie.

15. A method for generating information about a forest, the method comprising:
identifying a number of locations in the forest over which an electromagnetic energy sensor system in an unmanned aerial vehicle generates the information about the forest by generating a point cloud with a resolution that meets a point cloud threshold and in which an information level of the information generated about the forest by the electromagnetic energy sensor system is reduced by an effect of cloud cover;
generating a route for the unmanned aerial vehicle to move to the number of locations and generate the information about the forest in the number of locations; and
continuously generate the route as changes in cloud cover occur over the forest;
wherein the route is based on a current location of a number of clouds and a prediction of movement of the number of clouds.

16. The method of claim 15 further comprising:
generating the information about the forest in the number of locations;
wherein the information is the point cloud.

17. The method of claim 16 further comprising:
identifying the number of locations using cloud information about clouds over the forest.

18. The method of claim 17 further comprising:
receiving the cloud information from a sensor system.

19. The apparatus of claim 1,
wherein a probabilistic model is used to predict the movement of the number of clouds;
wherein the route is generated for where the number of clouds are absent; and
wherein the route is adjusted such that the unmanned aerial vehicle flies under the number of clouds and returns above the number of clouds when the number of clouds have moved.

* * * * *